(12) United States Patent
Takahashi et al.

(10) Patent No.: US 8,190,805 B2
(45) Date of Patent: May 29, 2012

(54) INFORMATION PROCESSING APPARATUS AND METHOD FOR RECONFIGURING THE INFORMATION PROCESSING APPARATUS

(75) Inventors: Jin Takahashi, Kawasaki (JP);
Toshikazu Ueki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/626,152

(22) Filed: Nov. 25, 2009

(65) Prior Publication Data

US 2010/0146180 A1 Jun. 10, 2010

Related U.S. Application Data

(63) Continuation of application No. PCT/JP2007/000594, filed on Jun. 1, 2007.

(51) Int. Cl.
*H05K 7/10* (2006.01)
*G06F 3/00* (2006.01)
*G06F 11/00* (2006.01)

(52) U.S. Cl. .......... 710/302; 710/300; 710/301; 710/18; 370/241; 714/2

(58) Field of Classification Search ................ 710/18, 710/301, 302
See application file for complete search history.

(56) References Cited

U.S. PATENT DOCUMENTS

| 5,253,344 | A * | 10/1993 | Bostick et al. ........... 710/8 |
| 5,583,987 | A | 12/1996 | Kobayashi et al. |
| 6,314,501 | B1 * | 11/2001 | Gulick et al. ........... 711/153 |
| 6,334,177 | B1 | 12/2001 | Baumgartner et al. |
| 6,643,771 | B2 * | 11/2003 | Tsushima et al. ........... 713/1 |
| 6,684,343 | B1 | 1/2004 | Bouchier et al. |
| 6,725,317 | B1 * | 4/2004 | Bouchier et al. ........... 710/312 |
| 6,910,142 | B2 * | 6/2005 | Cross et al. ........... 713/324 |
| 6,993,640 | B2 * | 1/2006 | Doing et al. ........... 712/200 |
| 7,453,816 | B2 * | 11/2008 | Fields et al. ........... 370/241 |
| 7,480,911 | B2 * | 1/2009 | Lee et al. ........... 718/104 |
| 7,681,191 | B2 * | 3/2010 | Yuuki ........... 717/170 |
| 7,752,378 | B2 * | 7/2010 | Fukumura et al. ........... 710/317 |
| 2003/0110247 | A1 | 6/2003 | Tsushima et al. |

(Continued)

FOREIGN PATENT DOCUMENTS

JP 08-16534 1/1996

(Continued)

OTHER PUBLICATIONS

International Search Report for PCT/JP2007/000594, mailed Sep. 4, 2007.

(Continued)

*Primary Examiner* — Brian Misiura
(74) *Attorney, Agent, or Firm* — Fujitsu Patent Center

(57) ABSTRACT

The method for reconfiguring an information processing apparatus includes: transmitting, by the system management unit, a register setting request to set a register included in the control unit to a predetermined value to all of the system boards within the information processing apparatus, when a system board is added to or removed from any of the partitions; setting, by the system board that receives the register setting request, a register of a control unit of the local system board to the predetermined value, if a partition to which the local system board belongs includes the system board to be added or removed; and ignoring, by the system board that receives the register setting request, the register setting request if the partition to which the local system board belongs does not include the system board to be added or removed.

11 Claims, 12 Drawing Sheets

U.S. PATENT DOCUMENTS

2005/0091476 A1   4/2005   Doing et al.
2008/0126652 A1 * 5/2008   Vembu et al. .................. 710/268

FOREIGN PATENT DOCUMENTS

| JP | 08-95820 | 4/1996 |
| JP | 09-097241 | 4/1997 |
| JP | 2003-173325 | 6/2003 |
| JP | 2003-178044 | 6/2003 |
| JP | 2003-178045 | 6/2003 |
| JP | 2003-196254 | 7/2003 |
| JP | 2003-203060 | 7/2003 |
| JP | 2005-508045 | 3/2005 |
| JP | 2005-509213 | 4/2005 |
| JP | 2005-527006 | 9/2005 |
| JP | 2006-172483 | 6/2006 |
| WO | WO-03/014892 A2 | 2/2003 |
| WO | WO-03/014950 A2 | 2/2003 |
| WO | WO-03/038619 A1 | 5/2003 |

OTHER PUBLICATIONS

Extended European Search Report dated Nov. 9, 2011 for corresponding European Application No. 07737250.6.

Japanese Office Action Mailed Jan. 31, 2012 for corresponding Japanese Application No. 2009-516080, with English-language translation.

* cited by examiner

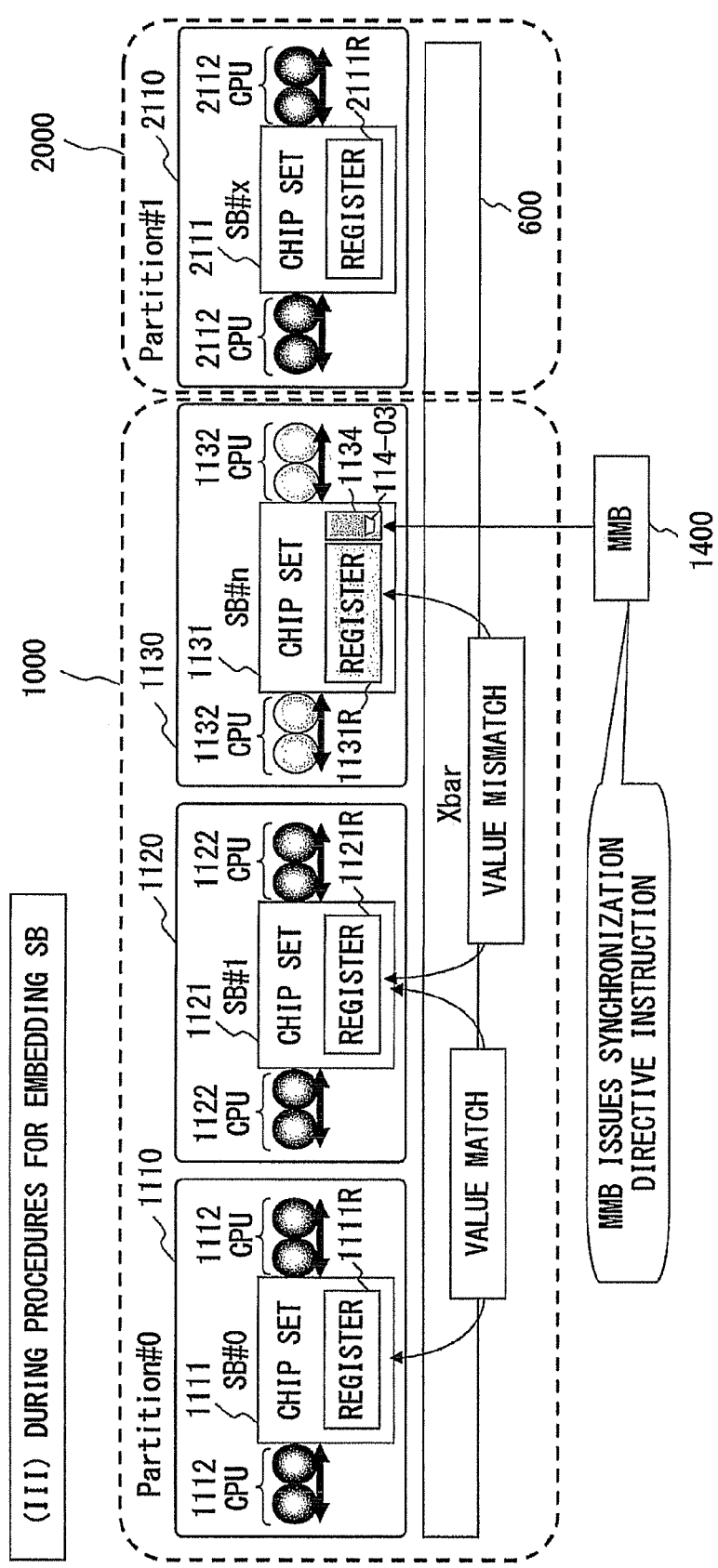
F I G. 9

INFORMATION PROCESSING APPARATUS AND METHOD FOR RECONFIGURING THE INFORMATION PROCESSING APPARATUS

CROSS-REFERENCE TO RELATED APPLICATIONS

This application is a continuation of PCT application PCT/JP2007/000594, which was filed on Jun. 1, 2007, the entire contents of which are incorporated herein by reference.

FIELD

The present invention relates to an information processing apparatus where a system board can be dynamically inserted or extracted during system operations (hot swap) when the system includes a plurality of system boards, on each of which is mounted a CPU (Central Processing Unit), a chip set including a memory controller, an I/O controller, etc., a memory, and the like, and to a method for reconfiguring the information processing apparatus.

BACKGROUND

Conventionally, partition technology is known as a method for configuring a server. With partition technology, resources (CPUs; chip sets including a memory controller, an I/O controller, etc.; memories; I/Os; etc.) of a server are divided into a plurality of partitions, in each of which an OS (operating system) and an application on the OS can be operated independently.

Partitions exist in three forms: a physical partition, a logic partition, and a resource partition. Among these forms, the physical partition is a form for electrically dividing the entire server into units of system boards (hereinafter referred to as SBs).

In the server, a plurality of physical partitions can be operated. The minimum configuration unit of physical partitions is an SB. Each SB can be operated as an independent server. Each physical partition is completely electrically divided. Accordingly, physical partitions have an advantage in that a hardware fault of one partition does not affect other partitions. Each SB is a board on which a CPU, a memory, a chip set, etc. are mounted, and can be inserted into or extracted from the housing (rack, etc.) of partitions.

In the meantime, a plurality of logic partitions can be operated in the server. Each logic partition includes a logic block that can independently operate an OS. Each logic block includes a CPU; a chip set including a memory controller, an I/O controller, etc.; a memory; and the like. If the CPU is a multi-core CPU such as a CMP (Chip Multi-Processor), etc., a logic partition can be configured in units of CPU cores as a minimum configuration unit of a logic block.

FIG. 1 illustrates an example of a system configuration of a server taking a physical partition form.

The server 10 illustrated in FIG. 1 includes an MMB (Management Board) 11 that is a kind of a service processor (SVP) as a system management unit of an information processing apparatus, eight SBs 12 (SB#0 to SB#7), eight I/O boards 13 (IOU#0 to IOU#7), a cross-bar switch 14, an SMBus (System Management Bus) 15, and the like. The MMB 11, the SBs 12, and the I/O boards 13 are interconnected by the SMBus 15 and the like. The SMBus 15 and the like are also connected to the cross-bar switch 14, which is connected to all the SEs 12 and the I/O boards 13 within the system.

In the server 10 configured as described above, the eight SBs 12 and the eight I/O boards 13 configure one physical partition (hereinafter denoted as a partition).

The MMB 11 has the configuration information of the partition, and sets a partition ID (PID) in each of the SBs 12 and each of the I/O boards 13 before the SBs 12 and the I/O boards 13 are activated. This setting can be only made for one SB 12 or one I/O board 13 at a time.

The SBs 12 and the I/O boards 13 can exchange data via the cross-bar switch 14. This data exchange is made with a packet. When transmitting the packet, the SBs 12 and the I/O boards 13 assign a partition ID. The SBs 12 and the I/O boards 13 receive a packet transmitted from the other SBs 12 and I/O boards 13 via the cross-bar switch 14, and ignore a partition ID assigned to the packet if the assigned partition ID is not the same as the partition ID of the local SB 12 or I/O board 13.

A function to dynamically reconfigure the system by adding (inserting), replacing, or removing (extracting) an SB 12 or an I/O board 13 during partition operations in the server configured as described above is called dynamic reconfiguration (DR). In dynamic reconfiguration, the registers of chip sets of the SBs 12 or the I/O boards 13 are required to match in order to maintain the coherency of the system.

In the meantime, a function to dynamically reconfigure the system by adding (inserting), replacing or removing (extracting) an SB 12 or an I/O board 13 during system suspension or partition suspension at a power halt is called static reconfiguration (SR).

"Reconfiguration" is assumed to include both the dynamic reconfiguration (DR) and the static reconfiguration (SR).

Each SB 12 includes a register the value of which varies according to data flowing during system operations. The dynamic reconfiguration (hereinafter referred to as DR) is the function to add, replace, remove, etc. an SB 12 or an I/O board 13 during partition operations. For example, if an SB 12 is newly added to a partition, the value of the register (of the chip set) within the SB 12 to be added and that of the register (of the chip set) within the currently operating SB 12 in the partition mismatch. Accordingly, to implement DR, the value of the register within the SB 12 to be newly added to the partition and that of the register within the currently operating SB 12 in the partition are required to match at the same timing.

To make the values match, a method for simultaneously rewriting the values of the registers by the MMB 11 is considered. As described above, however, the MMB 11 cannot simultaneously rewrite the values of the plurality of registers.

FIG. 2 illustrates an example of a hardware configuration of a server taking a conventional physical partition form.

The server illustrated in FIG. 2 includes two partitions 100 (Partition #0) and 200 (Partition #1), an MMB 400, a switch 500, and a cross-bar switch 600. The partition 100 accommodates three SBs 110, 120 and 130. The partition 200 accommodates one SB 210. All the SBs 110, 120 and 130 within the partition 100 have the same configuration. Accordingly, the configuration of the SB 110 is described here. For reference numerals assigned to the components of the SBs 120 and 130, a sub number (such as the "01" of partition ID holding circuit 113-01) hyphenated to a main number (such as the "113" of the partition ID holding circuit 113-01) is changed so that the components of the SBs can be distinguished as illustrated in FIG. 2.

The SB 110 includes a register 111R, the partition ID holding circuit 113-01, a decoder 114-01, a packet issue timing circuit 115-01, a packet issue circuit 116-01, a packet arbiter 117-01, a decoder 118-01, and a to-different-circuit 119-01 (hereinafter denoted as a different circuit 119-01). In FIG. 2, a register 121R of the SB 120, a register 131R of the SB 130, and a register 211R of the SB 210 are denoted with different reference numerals in terms of their relationship with the descriptions of FIGS. 3 to 5 to be described later. However, these registers have the same configuration from a hardware viewpoint.

The register 111R is a register within the chip set. This is the register required to be initialized when the system is reconfigured (regardless of whether it is dynamically or statically) by newly inserting an SB into or extracting an SB from a partition to which the SB including the chip set belongs. This register 111R is cleared by an externally input reset signal (system reset signal). The partition ID holding circuit 113-01 holds a partition ID that is assigned to each partition by the MMB 500 before the SB 110 is activated. The partition ID holding circuit 113-01 is, for example, a register. The packet issue timing circuit 115-01 instructs the packet issue circuit 116-01 of a packet to be issued. The packet issue circuit 116-01 generates the packet corresponding to the instruction, and outputs the generated packet to the packet arbiter 117-01. The packet arbiter 117, to which packets from the packet issue circuit 116-01 and a different circuit (not illustrated) are input, arbitrates the packets according to their priorities, etc. Then, the packet arbiter 117 transmits the packets to an arbiter 601 provided within the cross-bar switch 600 according to arbitration results.

The arbiter 601 receives the packets from packet arbiters 117 of the SBs within the system, and arbitrates the packets according to their priorities, etc. Then, the arbiter 601 transmits the packets to the SBs within the system according to arbitration results. The transmission of the packets is made, for example, by broadcasting.

The decoder 114-01 of the SB 1110 receives a packet transmitted from the arbiter 601, and determines whether or not the packet is addressed to the local SB. This determination is made by comparing the partition ID assigned to the received packet with the partition ID held in the partition ID holding circuit 113-01. If both of the IDs match, the decoder 114-01 determines that the received packet is the packet addressed to the local SB. If the received packet is the packet addressed to the local SB, the decoder 114-01 transmits the packet to the different circuit 119-01. If the received packet is not the packet addressed to the local SB, the decoder 114-01 discards the packet. The decoder 118-01 receives an instruction transmitted from the MMB 400 via the switch 500. Then, the decoder 118-01 decodes the instruction to generate a control signal, and outputs the control signal to the different circuit 119-01. The different circuit 119-01 executes the process corresponding to the control signal.

The MMB 400 is a unit for managing the system, and manages information (system configuration information) about the configuration of the system, such as configuration information of each partition within the system, and the like. The MMB 400 sets a partition ID in each SB or I/O board (not illustrated) before the SB and the I/O board are activated. This setting is made via the switch 500. Namely, the MMB 400 outputs, to the switch 500, an instruction to set a partition ID in each SB and each I/O board within the system. This instruction is sequentially issued to the individual SBs and I/O boards, and transmitted by the switch 500 to the SBs and the I/O boards within the system. Moreover, the MMB 400 sets or updates the value of the register of each SB and each I/O board within the system. The setting or updating of the value of the register is also made by individually transmitting the instruction to the SBs and the I/O boards via the switch 500.

The switch 500 transmits the instruction issued from the MMB 400 to the SBs within the partitions via the SMBus, etc. (not illustrated). The cross-bar switch 600 is a communication path for exchanging a message between SBs and between an SB and an I/O board. The cross-bar switch 600 includes the arbiter 601. The arbiter 601, to which packets transmitted from the SBs within the system are input, transmits the packets to the SBs while arbitrating them. In the SBs, the packets are input to the decoder 114, which then decodes the packets.

FIGS. 3 to 5 illustrate a DR method of the server taking the conventional physical partition form, and the problem with it. In FIGS. 3 to 5, the same components as those illustrated in FIG. 2 are denoted with the same reference numerals. In the descriptions of FIGS. 3 to 5 to be provided later, the same components as those of the SBs are denoted only with main numbers for the sake of convenience.

(I) Before an SB is Embedded

Assume that the SB 130 (SB#n) is newly embedded (added) into the partition 100 of the server that includes the partitions 100 (Partition#0) and 200 (Partition#1), as illustrated in FIG. 3. Each SB of each of the partitions includes two CPUs and one chip set. In this example, the CPU 112 within the SB 110 is a dual core CPU including two CPU cores (the spheres in FIG. 3). Also, the other SBs include a CPU having a similar configuration. Moreover, the server includes the cross-bar switch (Xbar) 600.

FIG. 3 illustrates the state before the SB 130 is added to the partition 100. As illustrated in FIG. 3, all the values of the registers of the chip sets in the SBs within the partition 100 match before the SB 130 is embedded into the partition 100. Namely, the value of the register 111R within the chip set 111 of the SB 110 (SB#0) and that of the register 121R of the chip set 121 within the SB 120 (SB#1) match. In contrast, the value of the register 211R within the chip set 211 of the SB 210 of the partition 200 and those of the registers 111R and 121R within the partition 100 mismatch. However, since the partitions are different, this mismatch is not a problem from a system viewpoint. Additionally, the CPU 132 within the SB 130 is put in a suspended state.

(II) During Procedures for Embedding the SB

In the state illustrated in FIG. 3, the SB 130 is embedded (added) into the partition 100 as illustrated in FIG. 4. The CPU 132 within the SB 130 is held in a suspended state when the SB 130 is embedded. In the initial state where the SB 130 is embedded into the partition 100, the values of the registers 111R and 121R within the chip sets 111 and 121 of the SBs 110 and 120 and that of the register 131R within the chip set 131 of the SB 130 do not match in the partition 100. However, since the CPU 132 within the SB 130 is being suspended, this is not a problem from a system viewpoint.

(III) Completion of Embedding the SB

Then, the operations of the CPU 132 within the SB 130 are started to complete the embedding of the SB 130 into the partition 100 as illustrated in FIG. 5. At this time, the value of the register 111R within the chip set 111 of the SB 110 and that of the register 121R within the chip set 121 of the SB 120 match. However, the value of the register 131R within the chip set 131 of the SB 130 and those of the above described registers do not match. Accordingly, it is possible for the server to be suspended during system operations.

As described above, DR of the server taking the conventional physical partition form has the problem wherein the server might enter a suspended state during system operations if an SB is newly embedded (added) into a partition.

In the meantime, the following techniques are known as techniques similar to the present invention.

The first known technique is the invention related to the connection verification method used at the time of dynamic reconfiguration of a computer system (see Patent Document 1).

The second known technique is the invention related to the technique for dynamically configuring an interconnection within a computer system. According to this invention, a predetermined condition of a trigger for reconfiguring a computer system is detected, and the mode of a signal path affected by the condition is dynamically reconfigured according to the detected condition (see Patent Document 2).

The third known technique is the invention related to the dynamic reconfiguration of a user interface of a functional module of a control platform (see Patent Document 3).

Patent Document 1: Japanese Laid-open Patent Publication No. H08-095820

Patent Document 2: Japanese Laid-open Patent Publication No. 2003-178044

Patent Document 3: Japanese Laid-open Patent Publication No. 2006-172483

SUMMARY

A method for reconfiguring an information processing apparatus according to the present invention assumes a method for reconfiguring an information processing apparatus including partitions to each of which belongs a system board having a CPU as a processing unit and a chip set as a control unit, and a service processor as a system management unit for controlling the partitions.

The method for reconfiguring an information processing apparatus according to the present invention includes: transmitting, by the system management unit, a register setting request to set a register included in the control unit to a predetermined value to all of the system boards within the information processing apparatus, when a system board is added to or removed from any of the partitions; setting, by the system board that receives the register setting request, a register of a control unit of the local system board to the predetermined value, if a partition to which the local system board belongs includes the system board to be added or removed; and ignoring, by the system board that receives the register setting request, the register setting request if the partition to which the local system board belongs does not include the system board to be added or removed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a schematic (No. 3) illustrating the operational procedures of DR in the server according to the embodiment of the present invention;

DESCRIPTION OF EMBODIMENTS

An embodiment according to the present invention is described below with reference to the drawings.

{Characteristics of a Server According to the Embodiment}

The server according to this embodiment can perform DR for adding an SB to or replacing an SB in a partition with no faults without suspending the system during partition operations. This DR is enabled by devising the circuit configuration of an SB, by adding a new packet for clearing (resetting) a register, by broadcasting the new packet, and by adding to an MMB a function to instruct the issuance of the new packet. A configuration and operations of the server according to this embodiment, which enables DR, are sequentially described below.

{System Configuration}

Figure 1:
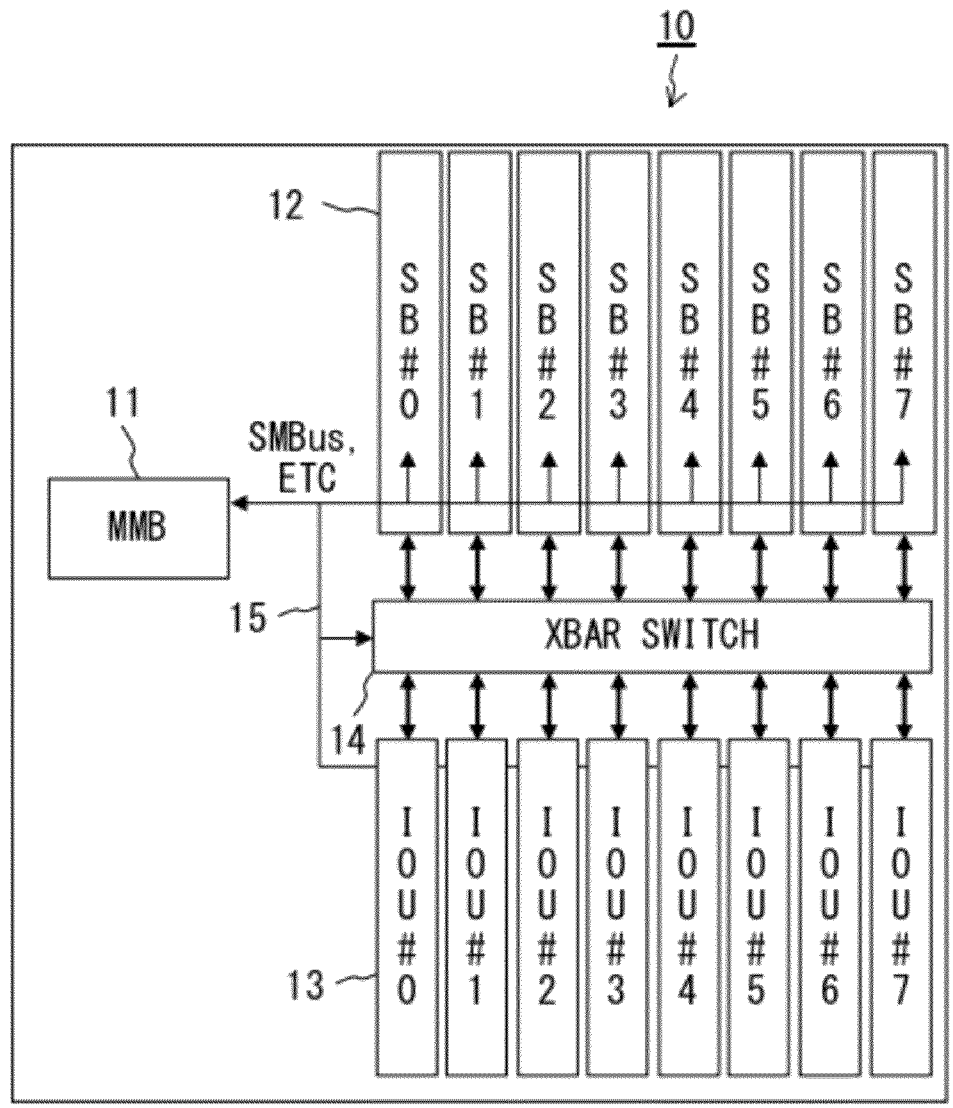
FIG. 1 illustrates an example of a system configuration of a server taking a physical partition form.
Figure 2:
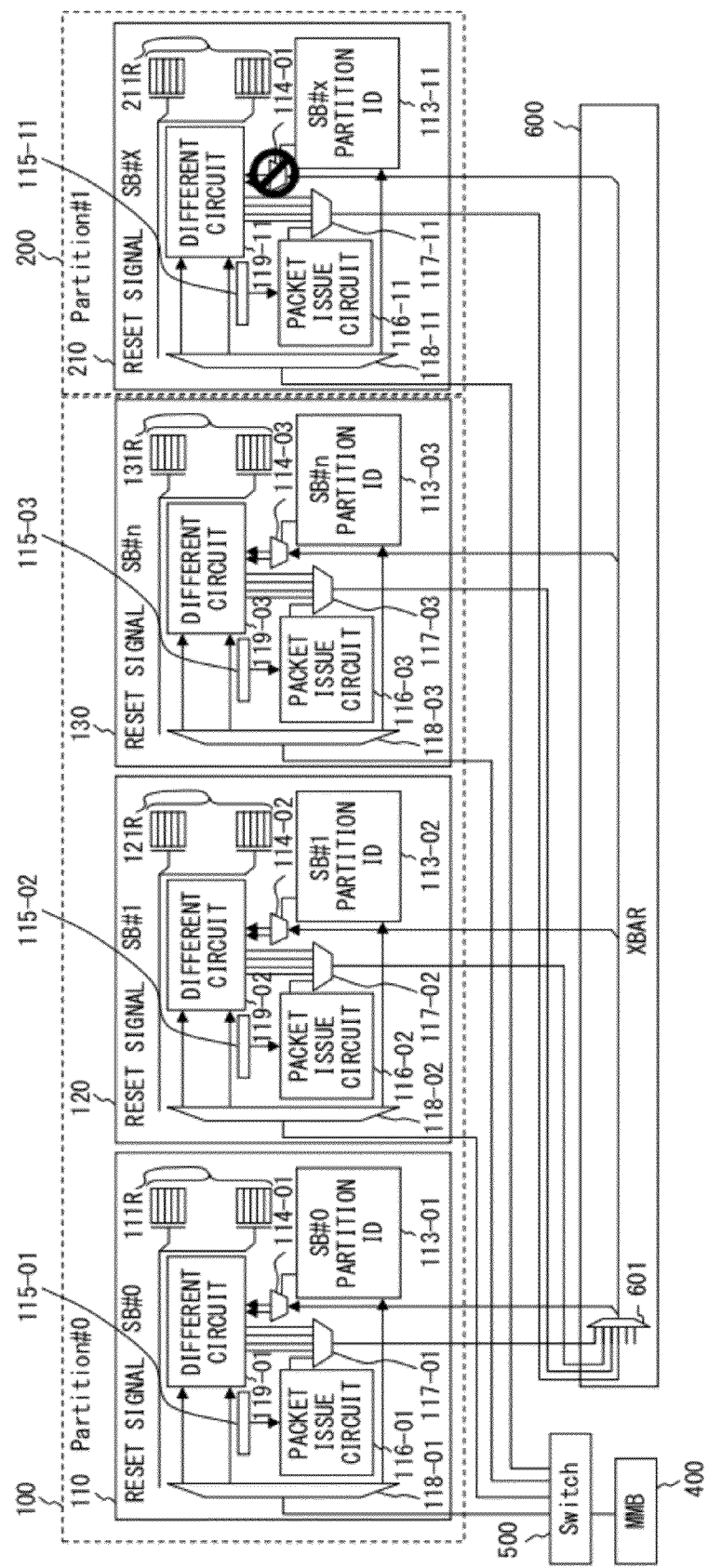
FIG. 2 illustrates an example of a hardware configuration of a server taking a conventional physical partition form.
Figure 6:
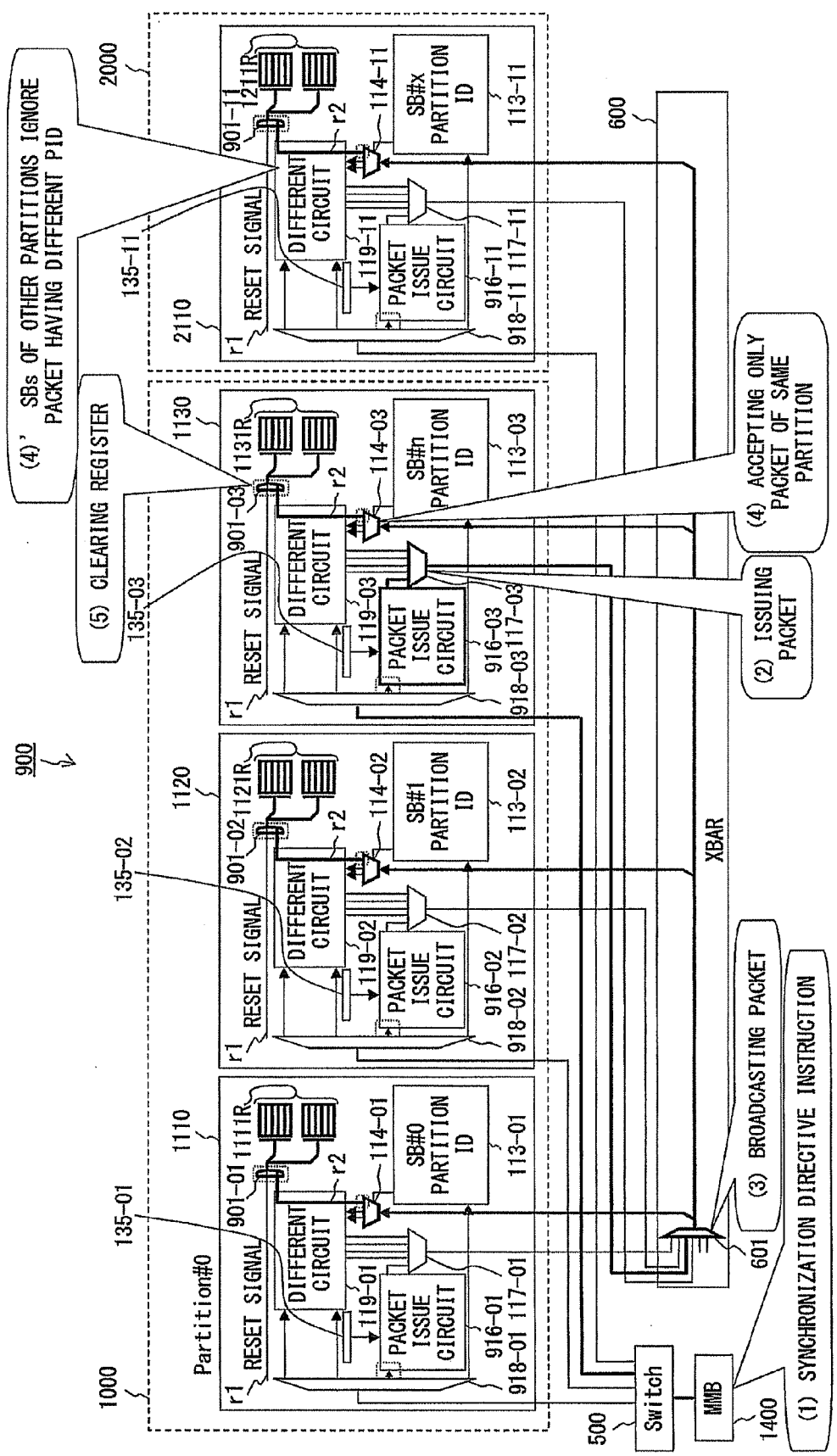
FIG. 6 illustrates an example of a system configuration of a server taking a physical partition form according to an embodiment of the present invention.

FIG. 6 illustrates an example of a system configuration of the server taking a physical partition form according to the embodiment of the present invention. In FIG. 6, the same components as those illustrated in FIG. 2 are denoted with the same reference numerals.

The configuration of the server 900 illustrated in FIG. 6 is characterized in the circuit configuration of an SB and that of the MMB. The server 900 has a configuration almost similar to the server illustrated in FIG. 2. Differences from the server illustrated in FIG. 2 exist in the circuit configurations of the SB 1110, 1120 and 1130 within the partition 1000 and the SB 2010 within the partition 2000, and the configuration and the functions of the MMB 1400. Also in FIG. 6, the same components as those included in each SB are denoted with the same reference numerals in a similar manner as in FIG. 2.

Each of the SBs 1110 to 1130 and 2110 within the partitions of the server 900 includes an OR gate 901 (901-01 to 901-03 and 901-11) to which the above described external reset signal (a first reset signal) r1 and an output signal (a second reset signal) r2 of the above described decoder are input. By including the OR gate 901, the server 900 can reset (clear) registers within chip sets of all the SBs accommodated within one partition upon input of a synchronization directive instruction to clear a register issued from the MMB 1400. The mechanism for resetting registers will be described in detail later.

The MMB 1400 has a function of issuing the synchronization directive instruction to synchronize and reset registers of chip sets within SBs of the system at the time of DR in addition to the above described functions included in the conventional MMB 400. This synchronization directive instruction is an instruction to direct the resetting of registers of chip sets within SBs in units of partitions.

The synchronization directive instruction to clear a register issued from the MMB 1400 is transmitted to an SB newly embedded into a partition via the switch 500. The synchronization directive instruction is input into the decoder within the SB.

Operations performed when the SB 1130 is newly embedded into the partition 1000 as illustrated in FIG. 6 are described here.

(1) When the SB 1130 of the partition 100 is newly embedded, the MMB 1400 transmits the synchronization directive instruction to the SB 1130 via the switch 500.

(2) The decoder 918-03 within the SB 1130 decodes the synchronization directive instruction, and instructs the packet issue circuit 916-03 to generate a packet (hereinafter referred to as a register reset packet) to instruct the resetting (clearing) of the registers of the chip sets within the SBs 1110 to 1130. The packet issue circuit 916-03 generates the register reset packet upon receipt of this instruction, and outputs the generated packet to the arbiter 117-03. The arbiter 117-03 transmits the register reset packet to the arbiter 601 within the cross-bar switch 600. The register reset packet is assigned a partition ID of the partition 1000 into which the SB 1130 is embedded. This partition ID is held in the partition ID holding circuit 113-03.

(3) The arbiter 601 within the cross-bar switch 600 broadcasts the register reset packet to all the SBs within the system bus upon receipt of the register reset packet.

Operations of the SBs within every partition which receives the register reset packet are the same. Accordingly, the operations of only the S1130 are described on behalf of the SBs within the partition 100.

(4) The SB 1130 receives the register reset packet broadcast by the arbiter 601-03 with the decoder 114-03. The decoder 114-03 compares the partition ID assigned to the register reset packet with the partition ID held in the partition ID holding circuit 113-03. If both of the partition IDs match, the decoder 114-03 determines that the register reset packet is a packet addressed to the local SB. The decoder 114-03 decodes the register reset packet, and outputs the reset signal r2 (second reset signal) to the OR gate 901-03.

(5) The OR gate 901-03 outputs the reset signal r2 to the register 1111R. The register 111R resets (clears) the value that the register itself holds upon input of the reset signal r2.

The above described operations are performed simultaneously in the other SBs 1110 and 1120 within the partition 1000, and the registers in the chip sets within all the SBs of the partition 1000 are synchronized and reset (cleared) at the same timing.

(4)' The register reset packet is also received by the decoder 114-11 in the SB 2110 of the partition 2000. Upon input of the register reset packet, the decoder 114-11 compares the partition ID assigned to the packet with the partition ID of the local SB, which is held in the partition ID holding circuit 113-11. If both of the partition IDs do not match, the decoder 114-11 determines that the register reset packet is not the packet addressed to the local SB. According to this determination result, the decoder 114-11 ignores and does not decode the register reset packet, and does not output the reset signal r2 to the OR gate 901. Accordingly, the register 2111R of the chip set within the SB 2110 is not reset (cleared).

As described above, when an SB is newly added to a partition within the server 900, the synchronization directive instruction is transmitted from the MMB 1400 to the added SB, and the register reset packet is generated and issued by the packet issue circuit of the added SB. This register reset packet is transmitted to all SBs within the server 900 via the cross-bar switch 600. Then, the registers of the chip sets within all the SBs of the partition to which the SB is newly added are synchronized and reset (cleared) simultaneously. As a result, all the values of the registers (of the chip sets) within the SBs of the partition to which the SB is newly added match. Consequently, the server does not suspend during system operations even when the CPU within the newly added SB is operated. Accordingly, DR of the server taking the physical partition form can be performed.

{Operational Procedures of DR}

Operational procedures of DR executed in the server 900 illustrated in FIG. 6 are described next with reference to FIGS. 7 to 12. In FIGS. 7 to 12, the same components as those of FIG. 6 are denoted with the same reference numerals.

An example of adding the SB 1130 to the partition 1000 of the server 900 with DR is described below. In the following description, the components of SBs are denoted with only main numerals and described for the sake of convenience.

(I) Before the SB is Embedded into the Partition

Figure 7:
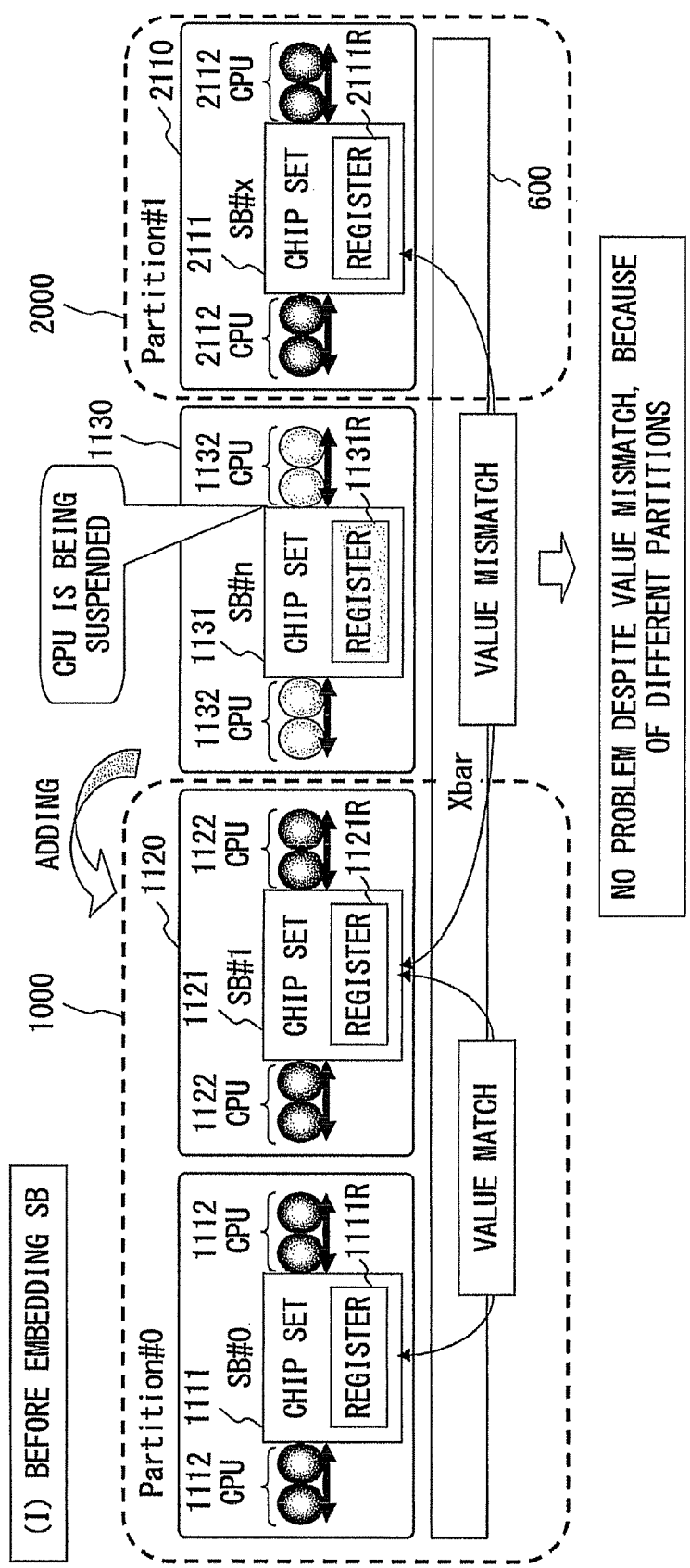
FIG. 7 is a schematic (No. 1) illustrating the operational procedures of DR in the server according to the embodiment of the present invention.

FIG. 7 illustrates the states of the partitions 1000 and 2000 before the SB 1130 is added to the partition 1000.

Figure 3:
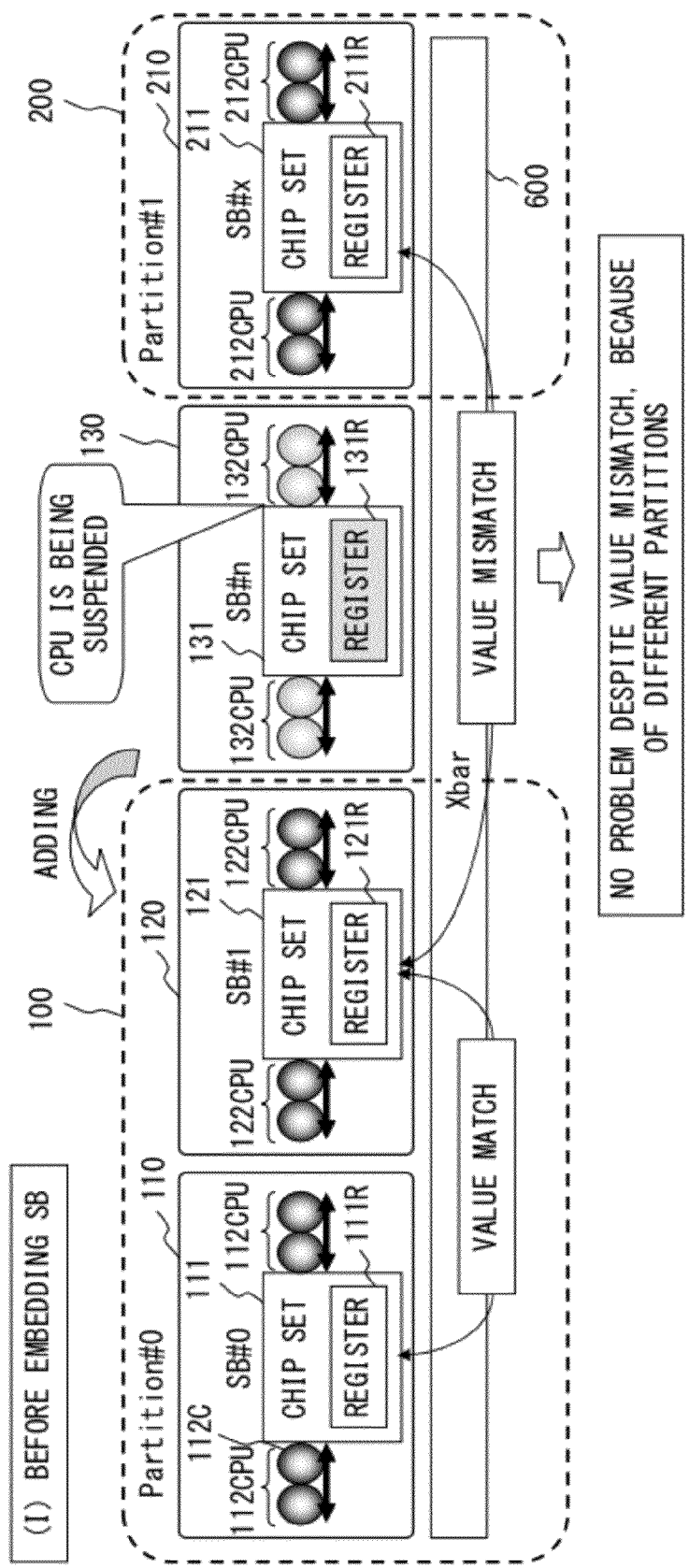
FIG. 3 is a schematic (No. 1) illustrating a DR method of the server taking the conventional physical partition form.

The states illustrated in FIG. 7 are the same as the above described states of the partitions 100 and 200 in FIG. 3. Namely, the values of the registers 1111R and 1121R in the chip sets 1111 and 1121 of the SBs 1110 and 1120 within the partition 1000 match. However, the values of the registers of the partition 1000 and that of the register 2111R in the chip set 2111 of the partition 2000 do not match. As described above, if the partitions are different, the operations of the server 900 do not have a problem even if the values of the registers within the chip sets of the SBs do not match. Moreover, two CPUs 1132 of the SB 1130 embedded into the partition 1000 are suspended.

(II) During the Procedures for Embedding the SB into the Partition (Phase I)

Figure 8:
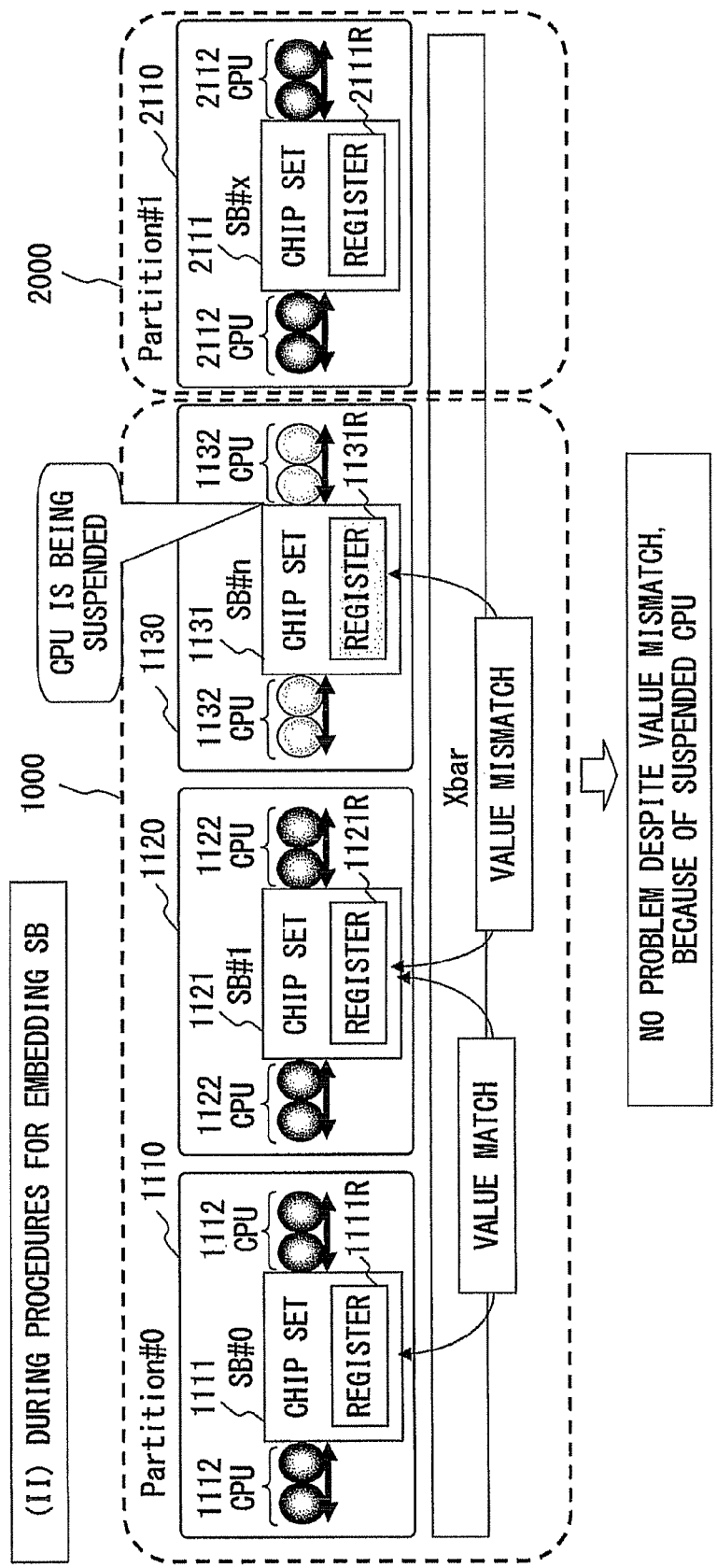
FIG. 8 is a schematic (No. 2) illustrating the operational procedures of DR in the server according to the embodiment of the present invention.

FIG. 8 illustrates the initial state (Phase I) where the SB 1130 is embedded into the partition 1000.

Figure 4:
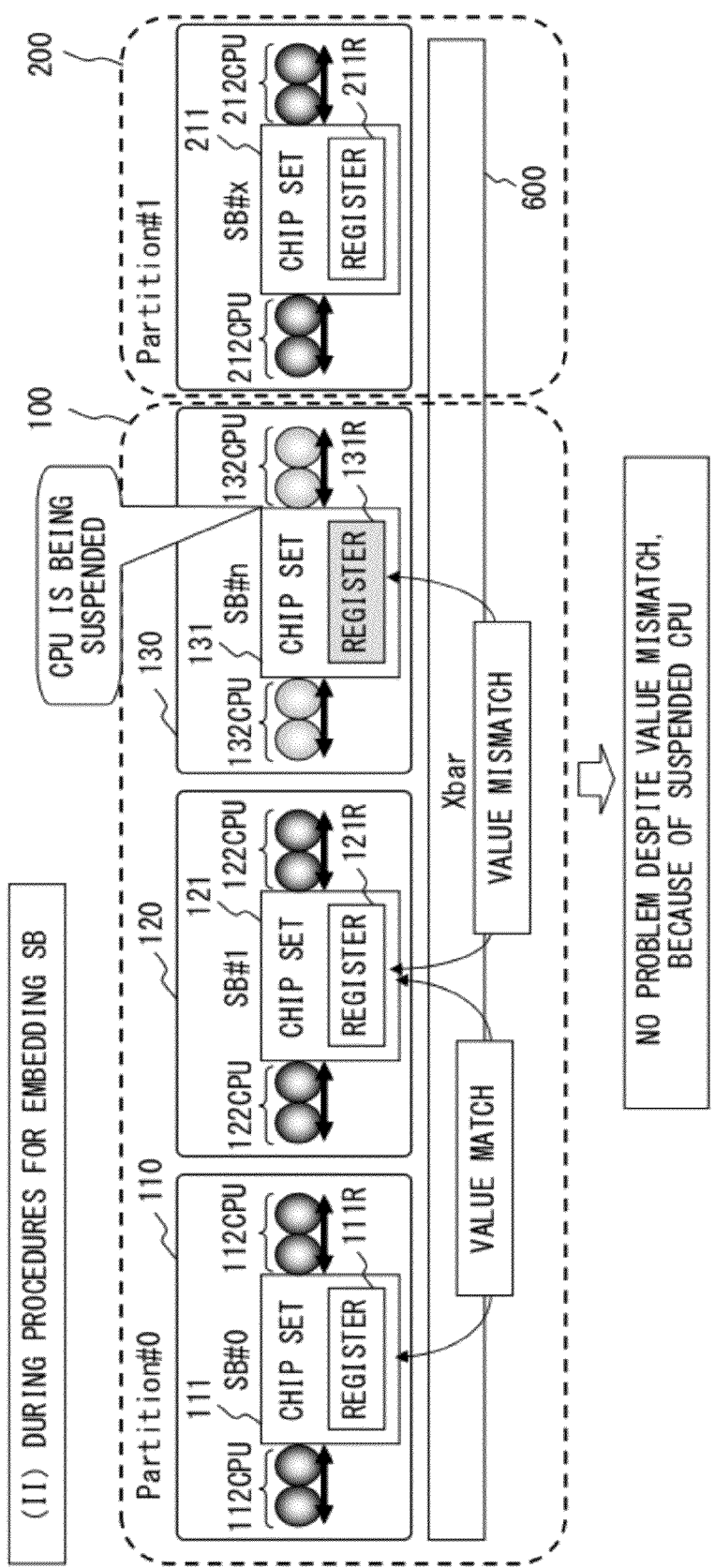
FIG. 4 is a schematic (No. 2) illustrating the DR method of the server taking the conventional physical partition form.
Figure 5:
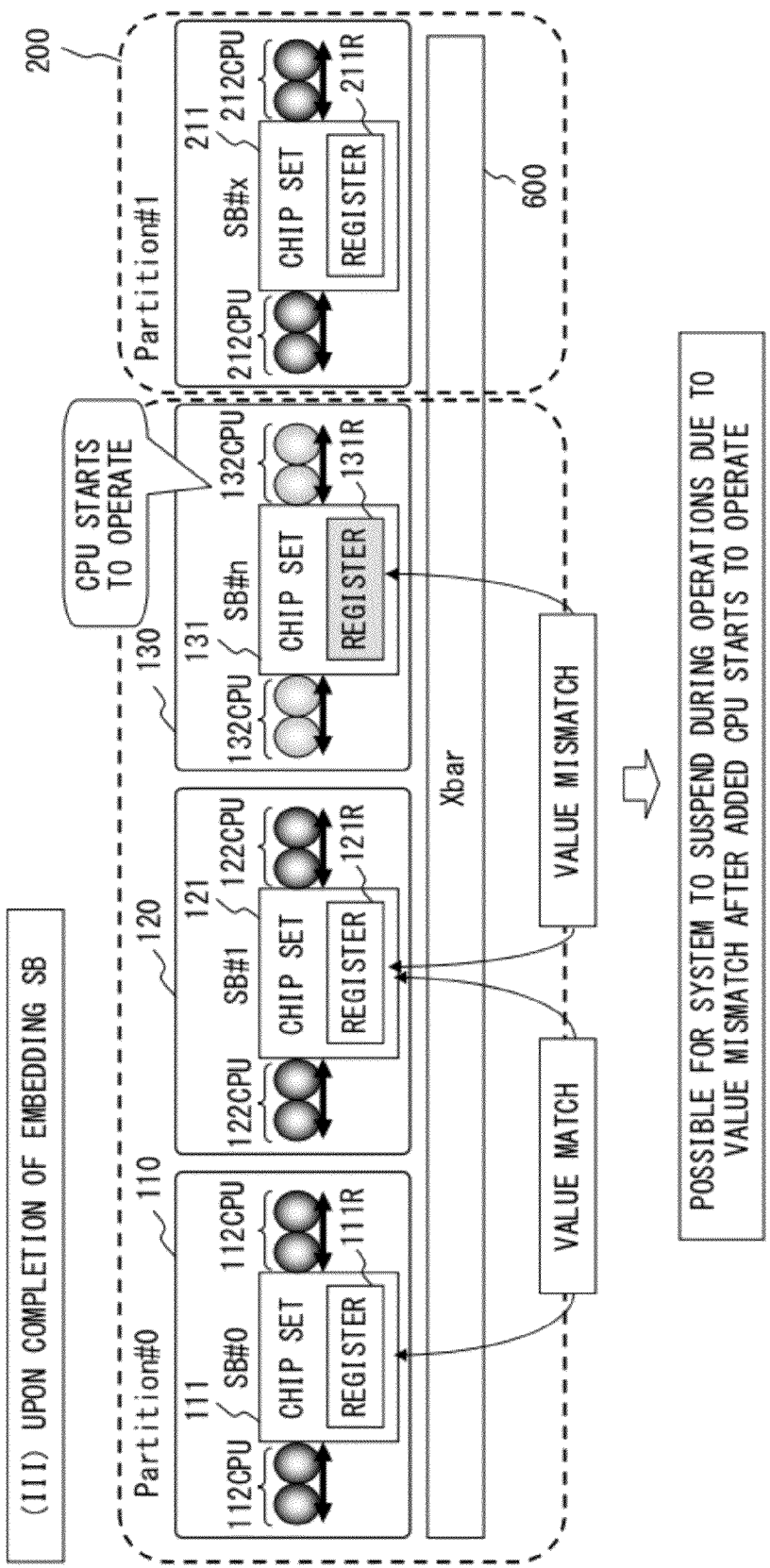
FIG. 5 is a schematic (No. 3) illustrating the DR method of the server taking the conventional physical partition form.

The state illustrated in FIG. 8 is the same as the above described state illustrated in FIG. 4. The CPU 310 of the SB 1130 embedded into the partition 1000 is in a suspended state, and the content of the register 1131R within the chip set 1311 of the SB 1130 and of the registers of the chip sets 1111 and 1121 of the SBs 1110 and 1120 already embedded into the partition 1000 do not match. In this case, no faults occur in the operations of the server 900. This is because the CPU 1132 of the SB 1130 is in a suspended state even though the registers of the SBs within the chip sets of the partition 1000 do not match.

(III) During the Procedures for Embedding the SB into the Partition (Phase II)

FIG. 9 illustrates the state (Phase II) where the synchronization directive instruction is issued from the MMB 1400 to the SB 1130 newly embedded into the partition 1000 in Phase I of the procedures for embedding the SB.

In FIG. 9, a block 1134 is a circuit including the decoder 918, the packet issue circuit 916, and the arbiter 117 of the SB 1130 illustrated in FIG. 6. Namely, the circuit 1134 is a circuit that generates and issues the register reset packet upon input of the synchronization directive instruction issued from the MMB 1400, and transmits the register reset packet to the arbiter within the cross-bar switch 600.

(IV) During the Procedures for Embedding the SB into the Partition (Phase III)

Figure 10:
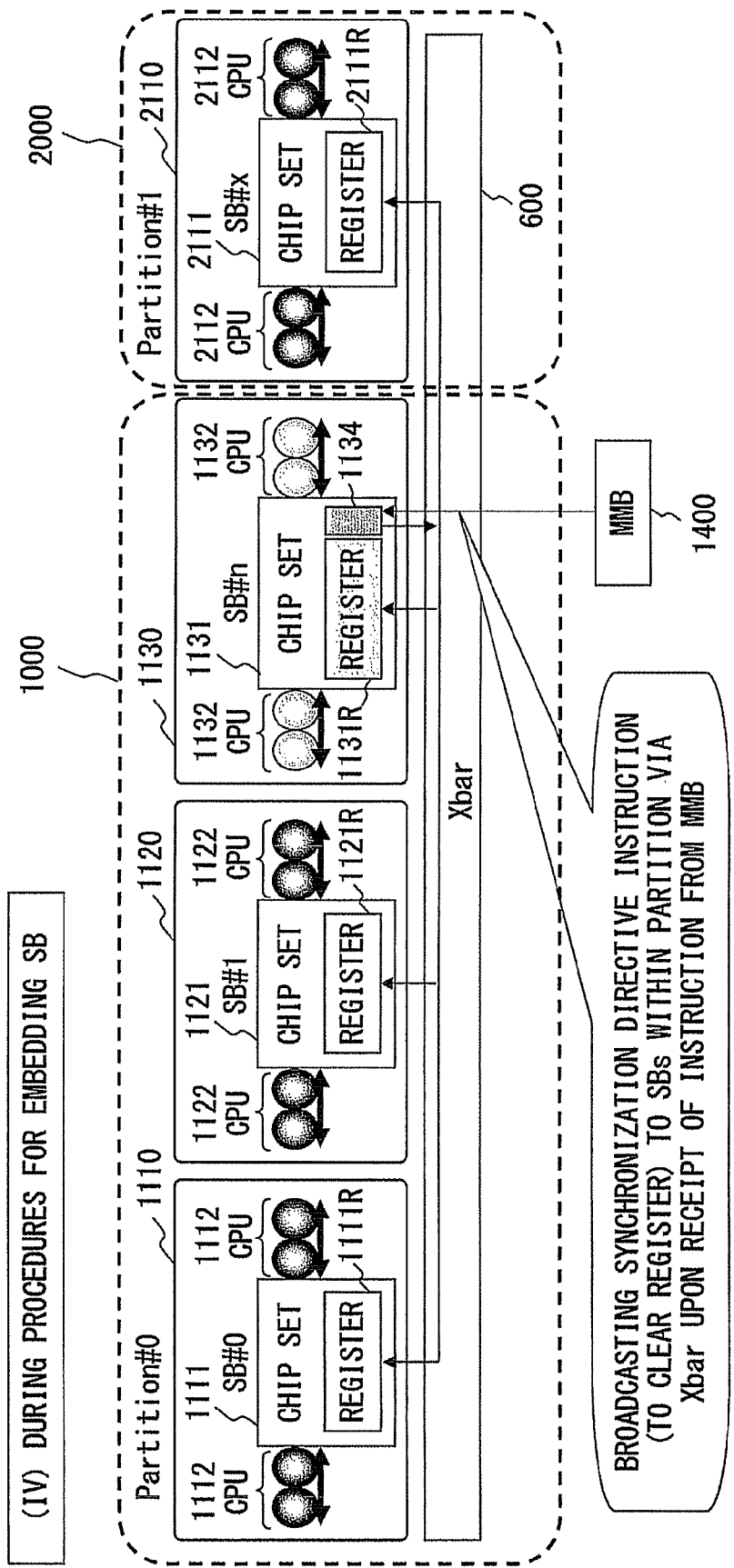
FIG. 10 is a schematic (No. 4) illustrating the operational procedures of DR in the server according to the embodiment of the present invention.

FIG. 10 illustrates operations performed after the synchronization directive instruction issued from the MMB 1400 is received by the circuit 1134 of the SB 1130 via the switch 500.

As described with reference to FIG. 6, the SB 1130 decodes the received synchronization directive instruction with the decoder 918, and instructs the packet issue circuit 916 to generate the register reset packet. Upon receipt of the instruction, the packet issue circuit 916 generates the register reset packet having assigned to it the partition ID that is assigned to the partition 1000 as a partition ID, and outputs the generated packet to the arbiter 117. Upon input of the register reset packet, the arbiter 117 transmits the register reset packet to the arbiter 601 of the cross-bar switch 600. The arbiter 601 broadcasts the register reset packet to all the SBs within the server 900 upon receipt of the register reset packet.

(V) During the Procedures for Embedding the SB into the Partition (Phase IV)

Figure 11:
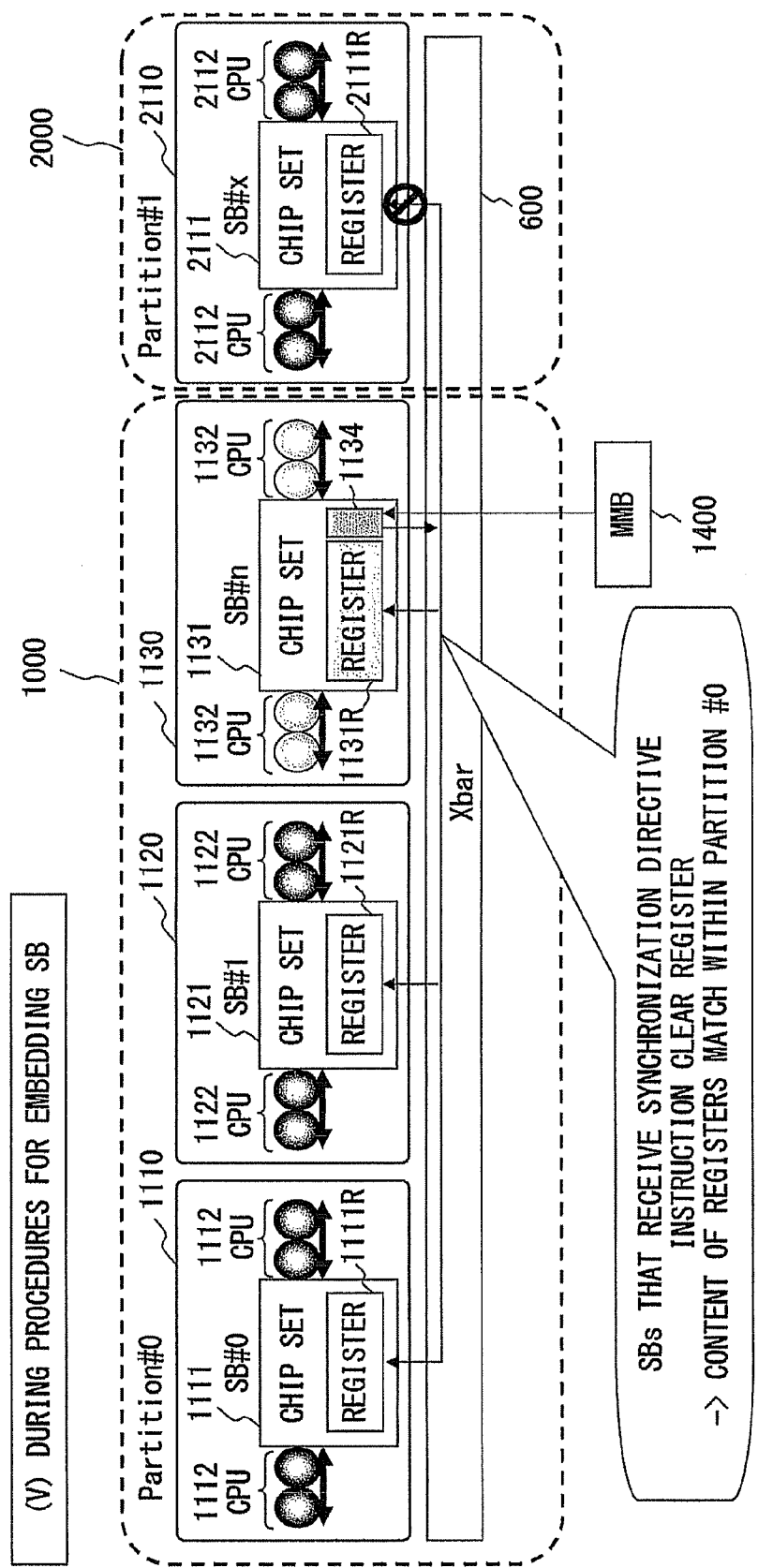
FIG. 11 is a schematic (No. 5) illustrating the operational procedures of DR in the server according to the embodiment of the present invention.

FIG. 11 illustrates the operations of the SB within the server 900, which receives the register reset packet.

The register reset packet broadcast from the arbiter 601 as described above is input into the decoders 1114 of the SBs 1110, 1120 and 1130 of the partition 1000, and that of the SB 2110 of the partition 2000. In this case, the partition ID assigned to the register reset packet is the partition ID of the partition 1000 as described above. Therefore, the register reset packet is discarded by the SB 2110 of the partition 2000 even though it is accepted by the decoders 1114 of all the SBs 1110 to 1130 within the partition 1000. As a result, the reset signal r2 is output from the decoder 1114 to the register within the chip set with the above described operational procedures to reset (clear) the register in all the SBs within the partition 1000. Consequently, the values of the registers within the chip sets of all the SBs match in the partition 1000.

(VI) Completion of Embedding the SB into the Partition

Figure 12:
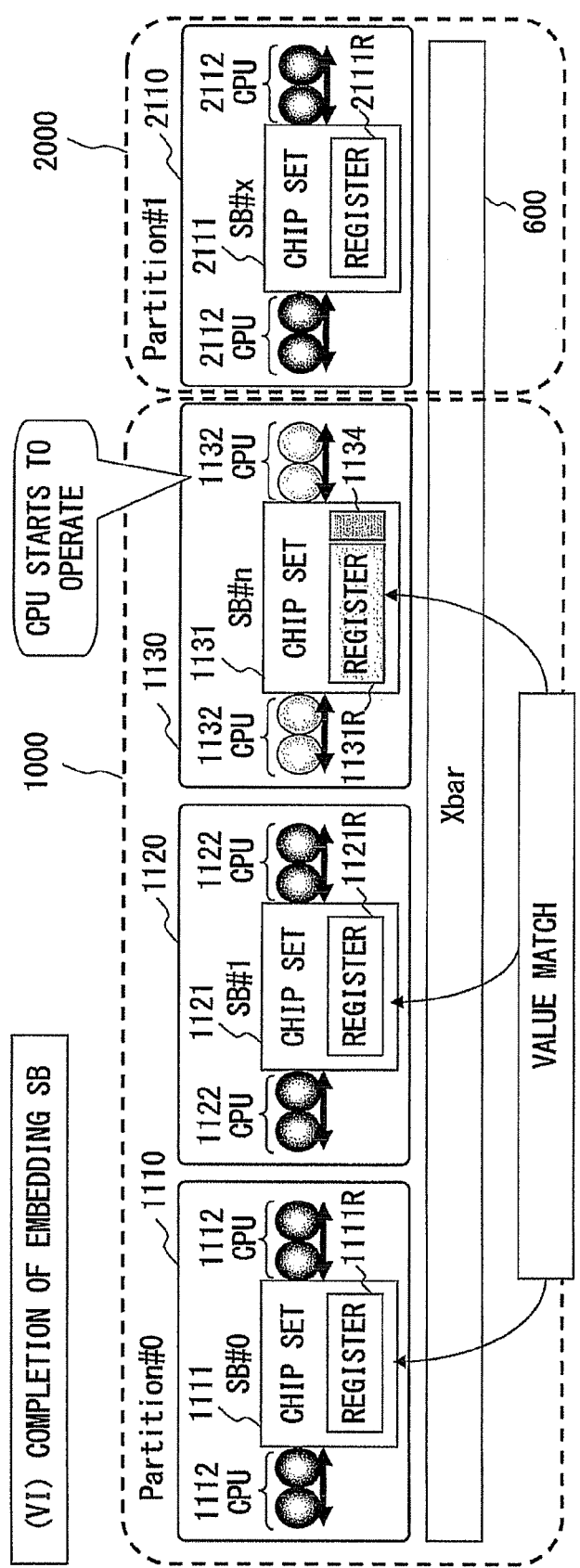
FIG. 12 is a schematic (No. 6) illustrating the operational procedures of DR in the server according to the embodiment of the present invention.

FIG. 12 illustrates operations performed after the procedures for embedding the SB (Phase IV) are terminated.

As described above, if the values of the registers 1111R to 1131R within the chip sets 1111 to 1131 within all the SBs 1110 to 1130 of the partition 1000 match in the procedures for embedding the SB (Phase IV), the operations of the CPU 1132 of the SB 1130 newly embedded into the partition 1000 are started. In this case, the server 900 properly operates without causing faults, and does not suspend during system operations. This is because the values of the registers within the chip sets in all the SBs of the partition 1000 match before the operations of the CPU 1132 start.

With the above described procedures (I) to (VI), DR for embedding the SB 1130 into the partition 1000 of the server 900 is properly performed.

Registers within the chip sets, the values of which are required to match, in all the SBs within a partition into which an SB is embedded when DR is performed as described above are, for example, priority registers. The priority register is a register that determines the priorities of requests if there are plurality of processing request sources. This register is included in each SB. For the priority register, its initial value may be the same in all the SBs within a partition, and is not specified. The value of this register varies according to current state of a processing order during system operations.

In the meantime, an SB newly added to a partition generates and issues the register reset packet in the above described embodiment. However, an SB already included in the partition may be configured to generate and issue the register reset packet.

Additionally, the above described embodiment is implemented by applying the present invention to a DR that is performed when an SB is added, removed, or replaced to or from a partition. However, the present invention is not limited to this implementation, and it is also applicable to a DR that is performed when an I/O board is added, removed, or replaced to or from a partition.

The present invention is not limited to the above described embodiment, and can be modified and implemented in a variety of ways within a scope that does not depart from the gist of the present invention.

For example, the present invention may be applicable not only to a server (computer system) taking a physical partition form but also to a server (computer system) taking a logic partition form. In this case, the partitions 1000 and 2000 illustrated in FIG. 6 are implemented as logic partitions to which SBs belong. Which logic partition each SB belongs to is determined according to a partition ID held in the partition ID holding circuit 113 within each SB. Namely, an SB belonging to each logic partition is determined according to a partition ID set in the partition ID holding circuit 113 within each SB. Since the same partition ID is assigned to SBs belonging to the same logic partition, the same partition ID is held in the partition ID holding circuits 113 of all the SBs belonging to the same logic partition. If the server 900 illustrated in FIG. 6 is implemented as a server taking such a logic partition form, the partitions 1000 and 2000 are implemented as logic partitions, and dynamic reconfiguration for inserting an SB into or extracting an SB from the partitions 1000 and 2000 can be performed with a method similar to the above described server 900 taking the physical partition form.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for reconfiguring an information processing apparatus including system boards having a processing unit and a control unit, each system board belongs to one of partitions, and a system management unit for controlling the partitions, the method comprising:

transmitting to all system boards a register setting request to set a value in a register that is included in the control unit for determining a priority of requests among a plurality of processing request sources to a predetermined value within the information processing apparatus by the system management unit, when a system board is added to or removed from any of the partitions;

setting a register of a control unit of one of the system boards to the predetermined value as requested by the received register setting request when the system board that received the register setting request belongs to one of the partitions which a system board is added thereto or removed therefrom; and ignoring the received register setting request when the system board that received the register setting request does not belong to one of the partitions which a system board is added thereto or removed therefrom.

2. The method according to claim 1, wherein
the setting the register of the control unit to the predetermined value is executed during operations of adding or removing the system board.

3. The method according to claim 1, wherein
the setting the register of the control unit of the local system board to the predetermined value is executed synchronously by all system boards belonging to the partition that includes the system board to be added or removed.

4. The method according to claim 1, wherein
the processing unit on the system board to be added starts to operate after registers of control units within all system boards belonging to the partition are set to the predetermined value.

5. An information processing apparatus, comprising:
partitions that each includes a system board having a processing unit and a control unit, and in each of the partition an operating system operates;
a system management unit that controls the partitions and transmits to all system boards a register setting request to set a value in a register that is included in the control unit for determining a priority of requests among a plurality of processing request sources to a predetermined value, when a system board is added to or removed from any of the partitions, wherein
the system board that receives the register setting request and sets a register of a control unit of the system board to the predetermined value as requested by received register setting request when the system board that received the register setting request belongs to a partition which a system board is added thereto or removed therefrom.

6. The information processing apparatus according to claim 5, wherein
the system board that receives the register setting request ignores the register setting request, if the partition to which the local system board belongs does not include the system board to be added or removed.

7. The information processing apparatus according to claim 5, wherein
the system board that receives the register setting request sets the register of the control unit of the local system board to the predetermined value during operations of the partition.

8. The information processing apparatus according to claim 5, wherein
all system boards that receive the register setting request within the information processing apparatus simultaneously set the register of the control unit of the local system board to the predetermined value, if the partition to which the local system board belongs includes the system board to be added or removed.

9. The information processing apparatus according to any one of claims 5, wherein
operations of the processing unit on the system board to be added start after registers of control units within all system boards belonging to the partition are set to the predetermined value.

10. A method for reconfiguring an information processing apparatus including partitions to each of which a different system board having a processing unit and a control unit belongs to, and a system management unit for controlling the partitions, the method comprising:
transmitting, from the system management unit to all of the system boards within the information processing apparatus, a register setting request to request each system board to set a predetermined value into a register in the control unit of the system board, when a system board is added to or removed from any of the partitions;
setting the predetermined value as requested by the received register setting request to a register of a corresponding control unit when a system board received the register setting request belongs to a partition in which a system board is added to or removed from; and
ignoring the received register setting request when the system board received the register setting request does not belong to the partition in which a system board is added to or removed from.

11. An information processing apparatus, comprising:
system boards having a processing unit and a control unit, each system board belongs to one of partitions; and
a system management unit that controls the partitions, the system management unit transmits a register setting request to all of the system boards within the information processing unit when any system board is added to or removed from the information processing apparatus, the register setting request is a request to set a predetermined value to a register in the control unit;
wherein when received the register setting request, the control unit sets the predetermined value to register of the control unit when the system board belongs to a partition in which a system board is added to or removed from, while ignoring the received register setting request when the system board does not belong to the partition which a system board is added thereto or removed therefrom.

* * * * *